United States Patent [19]

Zahn

[11] Patent Number: 4,832,622

[45] Date of Patent: May 23, 1989

[54] ENDLESS ELECTRICAL CONNECTOR

[75] Inventor: Irwin Zahn, New York, N.Y.

[73] Assignee: Autosplice, Inc., New York, N.Y.

[21] Appl. No.: 6,440

[22] Filed: Jan. 23, 1987

[51] Int. Cl.$^4$ .............................................. H01R 13/40
[52] U.S. Cl. ..................................... 439/590; 29/874;
439/885
[58] Field of Search ......... 339/59 M, 218 M, 276 SF,
339/276 A, 276 S, 276 T; 439/586, 590, 598,
736, 869, 885; 29/874, 883, 884

[56] References Cited

U.S. PATENT DOCUMENTS

| | | |
|---|---|---|
| 857,589 | 6/1907 | Boyle . |
| 2,240,180 | 4/1941 | Frank ............................... 173/334.1 |
| 2,396,725 | 3/1946 | Thomas, Jr. ......................... 439/590 |
| 2,456,113 | 12/1948 | Dorner ................................... 18/34 |
| 3,082,397 | 3/1963 | Clarkson ............................. 339/157 |
| 3,378,808 | 4/1968 | French .................................. 339/59 |
| 3,500,295 | 3/1970 | Faber .................................. 339/176 |
| 3,721,944 | 3/1973 | Weidler ................................. 339/19 |
| 3,905,665 | 9/1975 | Lynch ............................. 339/17 L |
| 4,230,387 | 10/1980 | Zahn ................................. 339/59 M |
| 4,381,133 | 4/1983 | Lovrenich .......................... 339/59 R |
| 4,391,482 | 7/1983 | Czeschka .......................... 339/59 M |
| 4,404,744 | 9/1983 | Sterz et al. ............................ 29/883 |
| 4,466,692 | 8/1984 | Sonada .......................... 339/276 SF |
| 4,575,176 | 3/1986 | Castello et al. ................ 339/276 SF |
| 4,617,733 | 10/1986 | Olson ..................................... 29/874 |
| 4,655,517 | 4/1987 | Bryce ............................. 339/276 SF |

FOREIGN PATENT DOCUMENTS

453106 12/1950 Italy ..................................... 439/590

Primary Examiner—Gil Weidenfeld
Assistant Examiner—Paula A. Austin
Attorney, Agent, or Firm—Rosen, Dainow & Jacobs

[57] ABSTRACT

An endless electrical connector has a continuous header manufactured by forming axial segments in sequence. In the case of continuous extrusion, the axial segments are infinitesimal in length, whereas in the case of semicontinuous injection molding, the segments have discrete length.

5 Claims, 10 Drawing Sheets

ENDLESS ELECTRICAL CONNECTOR

FIELD OF THE INVENTION

This invention relates to electrical connectors of the type which include an insulating body carrying or having disposed therein electrical contacts, and more particularly relates to an "endless" connector so designated because of its continuous length which facilitates, on an end user basis, the manufacture of a connector of any predetermined number of contacts.

BACKGROUND OF THE INVENTION

Electrical connectors comprising an insulating body having electrical contacts carried thereby are well known in the art. In the so-called male connectors, the insulating body carries pin-like contacts which extend above and below the insulating body to facilitate electrical connection from one element, such as a printed circuit board, to another element, which may, for example, comprise a so-called female connector. As is well known, a female connector comprises an insulating body which carries an electrical contact which is generally capable of receiving at one end thereof a male pin, and at the other end thereof an electrical conductor which may be another male pin, a single electrical conductor, or a single strand of a multiconductor flat ribbon cable. Typically, the aforedescribed male connector and female connector are utilized in a tandem or coupled fashion to provide electrical connection from one element such as the printed circuit paths on a printed circuit board to individual conductors or the multiple conductors of a multiconductor ribbon cable.

The aforedescribed male and female table connectors are generally manufactured with a predetermined number of contacts carried thereby. For example, a typical male connector of the type described above might comprise a length of insulating material having ten, twenty, thirty, or any number of pins carried thereby. Similarly, a female connector may comprise a body of insulating material having individual cavities disposed therein, each cavity of which carries an electrical contact. Like the male connectors, the female connectors are commonly manufactured with ten, twenty, thirty, etc., contacts.

There are several drawbacks associated with the manufacture and use of both male and female connectors of the type described above. First, the end user may use several connectors, each having a different number of electrical contacts or "positions". He must therefore purchase and inventory many different connector sizes, i.e. he must maintain a supply of 8-position, 12-position, 20-position connectors etc.

Second, the present industry standard for the molded male header and its mating molded female connector is a fixed 36 positions in a single-row configuration, and two rows of 36 positions each in a double-row configuration, i.e. 72 positions. As an example, an end user using a single row 10-position pin header can cut three lengths (each having 10 positions) with a remainder of six positions, or a 17% scrap rate.

A continuous or endless connector would eliminate both the scrap and multiple inventory items.

A continuous connector for solving this problem was disclosed in U.S. Pat. No. 4,230,387, which disclosed an endless connector comprising a continuous length of insulating material with the length of insulating material having electrical contacts spaced therealong and being provided with severance means intermediate the contacts for selectively severing the length of insulating material at locations intermediate the contacts. In this manner, the end user need only store the endless connector and, in a given application, can sever the continuous length of insulating material in such a fashion that the resultant connector comprises exactly the number of contacts which is required for his particular electrical application.

In one embodiment of the connector disclosed in the U.S. Pat. No. 4,230,387, the endless connector is of the so-called male type in the sense that it includes a body of insulating material which has pins embedded therein. In another embodiment the connector is of the so-called female type having side-by-side cavities within which are disposed female type contacts. In accordance with another feature, the male and female type connectors are provided with interconnection means by which the may coact with one another to provide an electrical connection from one point, for example, an electrified aperture in a printed circuit board, through the male and female connectors to individual electrical connectors or the strands of a multiconductor flat ribbon cable.

The endless connector disclosed in U.S. Pat. No. 4,230,387 comprises a continuous length of insulating material manufactured by, for example, injection molding. In accordance with the method by which the endless connectors disclosed in U.S. Pat. No. 4,230,387 were manufactured, each continuous length of insulating material was made in a mold as a single piece. In other words the length of the piece of insulating material cannot be longer than the length of the mold. This limitation severely hampers the ability to manufacture so-called "endless" connectors, since the mold must in turn be "endless".

SUMMARY OF THE INVENTION

This limitation is overcome in accordance with the invention by manufacturing the length of insulating material, i.e. the header, in axial segments formed sequentially in a continuous or semicontinuous manner.

In one preferred embodiment of the invention, the axial segments are formed by extrusion in a continuous manner starting with one end of the header.

In another preferred embodiment of the invention, the axial segments are formed by injection molding in a semicontinuous manner.

After an "endless" header has been extruded and wound on a reel, the insulating material is fed to a machine which continuously punches holes and forms notches in the insulating material and then inserts pins, tabs, sockets, or other electrical contacts in the punched hole, thereby forming an endless connector. In the case of the injection molding, each discrete segment of the endless connector has holes molded therein for receiving electrical contacts.

It should be understood that the term "endless" or "limitless" will be used throughout this application to mean that the length of the endless item may be made to have any length in accordance with the method of the invention. Obviously a truly endless or "limitless" connector could only be manufactured by forming the connector continuously or semicontinuously for a time equal to infinity and the impossibility of this indicates that the term "endless" or "limitless" is not being used in this sense.

Accordingly, it is an object of the instant invention to provide an endless connector comprising an endless header having axial segments formed sequentially in a continuous or semicontinuous manner, the endless header having electrical contacts spaced therealong and being provided with severance means (i.e. notches) intermediate said contacts for selectively severing lengths of the header at locations intermediate said contacts.

It is another object to manufacture an endless header without the use of an equally endless mold, wherein the endless header can be wound as the ongoing formation of axial segments continues, thereby reducing the amounts of spaced and time required by the manufacturing process.

It is a further object of the instant invention to provide such an endless connector which facilitates the easy production, at the end user level, of electrical connectors having a predetermined desired number of electrical contacts carried thereby.

Yet another object of the instant invention is to provide such an endless connector which may be of the male or female type.

Yet another object of the instant invention is to provide an endless connector which can be coupled to another endless connector by way of interconnection means formed thereon.

Other objects of the instant invention will be recognized by referring to the following specifications and drawings.

BRIEF DESCRIPTION OF THE DRAWINGS

The preferred embodiments of the invention will be described in detail hereinafter with reference to the accompanying drawings.

DETAILED DESCRIPTION OF THE PREFERRED EMBODIMENTS

Figure 1A:
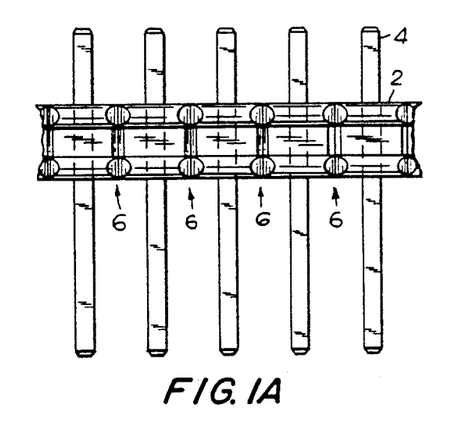
FIGS. 1A–C show side, end and top views of a single-row male connector manufactured in accordance with the invention.
Figure 1B:
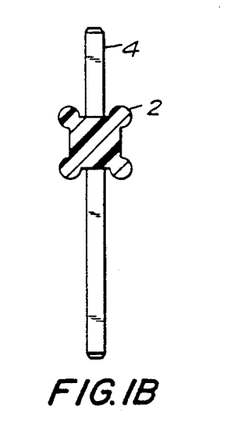
Figure 1C:
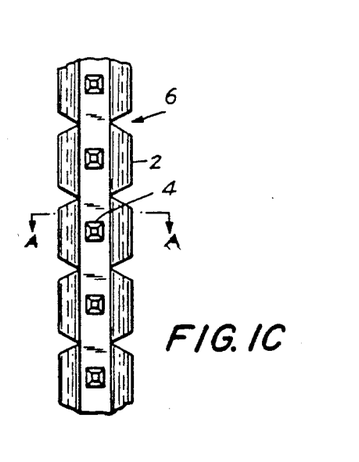

FIG. 1A shows a side view of a continuous connector having a single row of straight pin terminals inserted in the endless header 2. The pins 4 have a substantially square cross section, but also may have an expanded "star" section in the area covered by the plastic header for improved strength and for form-fitting with the plastic to prevent longitudinal displacement of the inserted pins. The sides of the header 2 have notches 6 formed therein, which notches are substantially V-shaped. The V-shaped notches 6 are directed substantially perpendicular to the longitudinal axes of the header. By severing the header at the two opposing notches, an electrical connector having a predetermined number of pin terminals can be formed. In the description which follows, the method of the invention will be described in connection with the manufacture of a single-row connector. However, other connectors, such as those shown in FIGS. 2–4, can be manufactured in accordance with the invention.

Figures 2A, 2B, 2C:
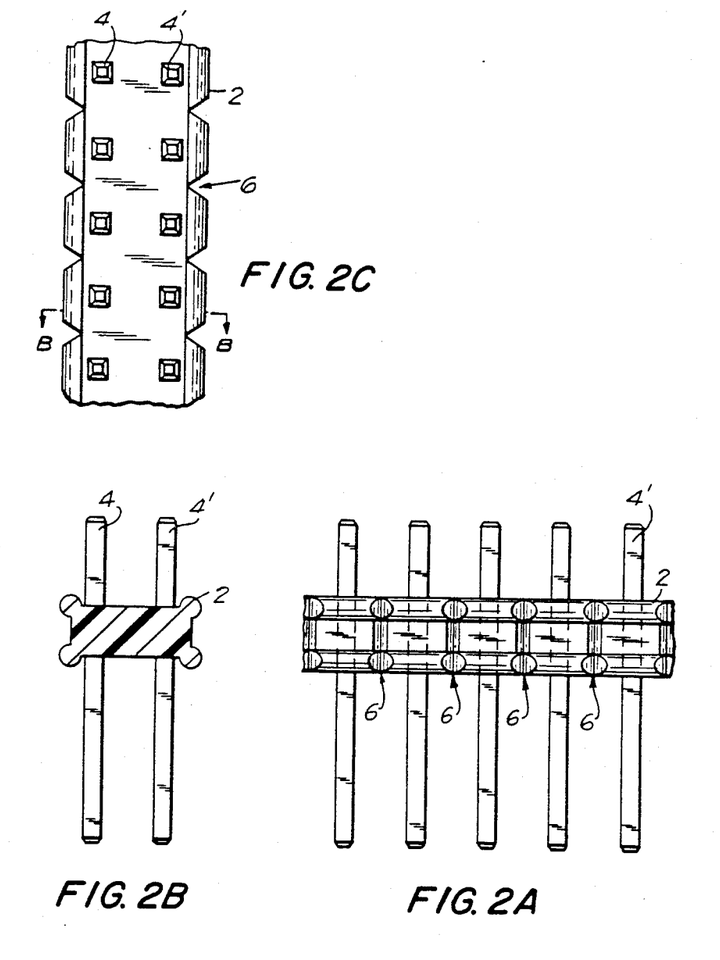
FIGS. 2A–C show side end and top views of a double-row male connector manufactured in accordance with the invention.
Figure 3A:
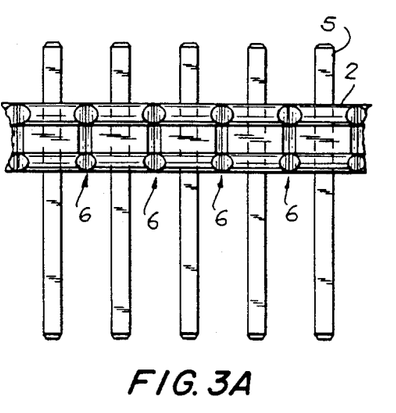
FIGS. 3A–C show side, end and top views of a single-row male right-angle connector manufactured in accordance with the invention.

FIG. 2A is a side view of a double-row connector according to the invention. It will be noted that the side view of FIG. 2A is identical to that of FIG. 1A. FIG. 2B shows an end view of a double-row endless connector. In this case the header 2 is wider than the header shown in FIG. 1 so that pairs of holes 8 can be formed in header for receiving the two rows of straight pins 4 and 4'.

Figure 3B:
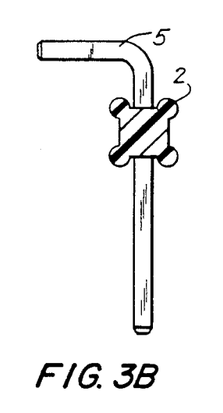
Figure 3C:
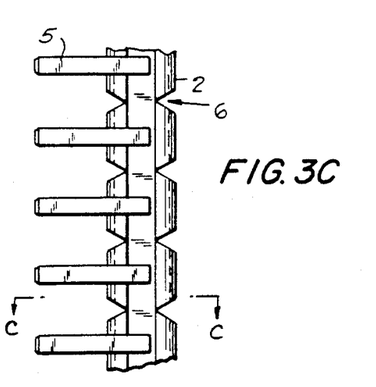
Figure 4A:
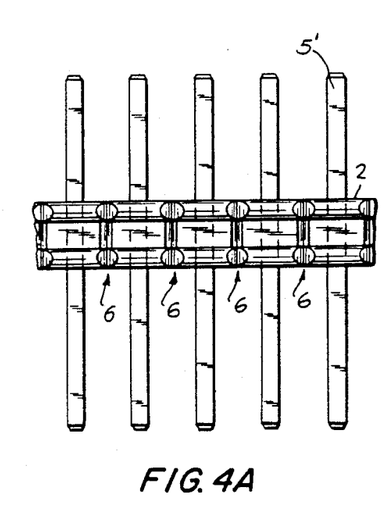
FIGS. 4A–C show side, end and top views of a double-row male right-angle connector manufactured in accordance with the invention.

The method according to the invention is not limited to that formation of endless connectors having straight pin terminals. FIG. 3B shows an end view of an endless connector having right-angle pin terminals 5 inserted in holes 8 formed in header 2. In the case of an electrical connector having a single row of right-angle pin terminals, the header 2 may be the same as that used in the electrical connector having a single row of straight pin terminals.

Figure 4B:
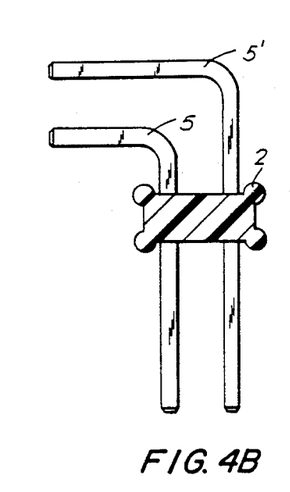
Figure 4C:
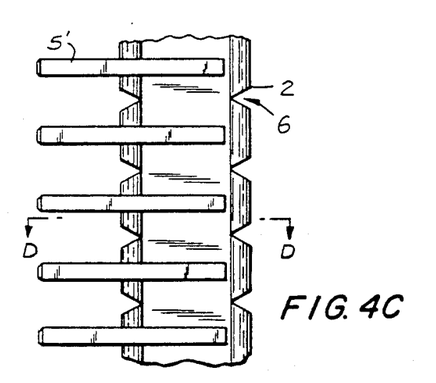

FIG. 4B shows an end view of an electrical connector having two rows of right-angle pin terminals. The pin terminals 5 of one row are smaller than the pin terminals 5' of the other row. In the case of the electrical connector shown in FIGS. 4A–C, the endless header may take the same form as the header of the electrical connector having two rows of straight pin terminals, shown in FIGS. 2A–C.

Although the electrical connectors shown in FIGS. 1-4 are provided with pin terminals, it is apparent that an electrical connector can be manufactured according to the invention having any type of electrical components inserted in an endless header.

Figure 5:
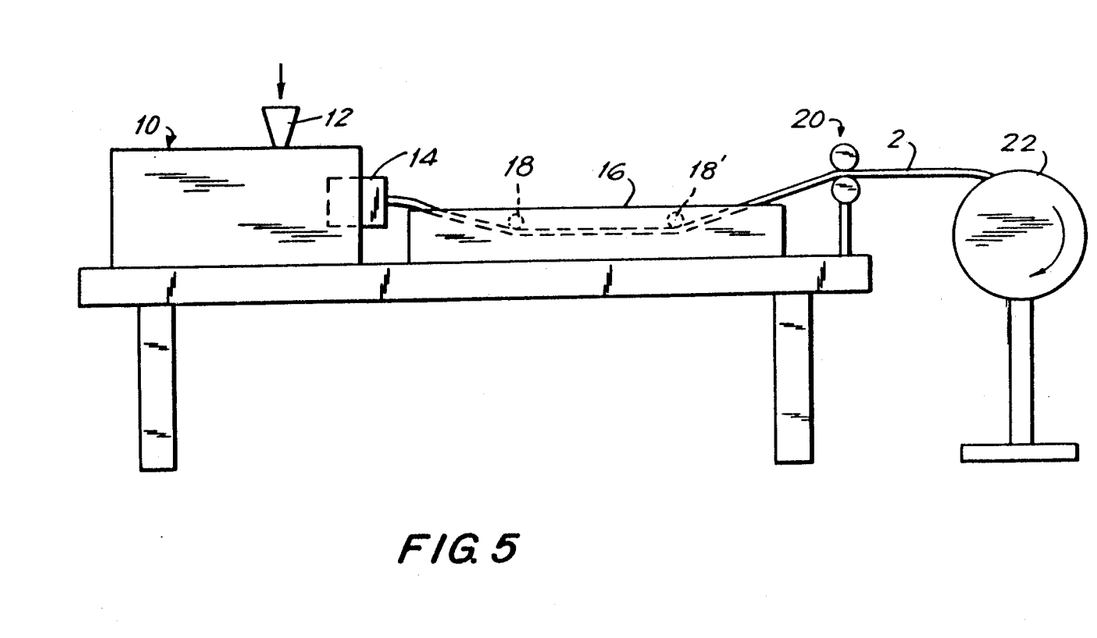
FIG. 5 is a diagrammatic side view of the apparatus for manufacturing an endless male connector by extrusion.

FIG. 5 is a diagrammatic view of the apparatus for manufacturing an endless header by means of extrusion. The extruder is generally indicated by numeral 10. Plastic granules are inserted in the extruder by way of hopper 12. Inside the extruder, in a well known way the plastic granules are heated to a molten state and then the molten plastic is pressed through hole 15 formed in metal die 14 (see FIG. 6). The shape of hole 15 is substantially congruent to the final header cross section. Such extruders are well known in the art. In one working embodiment the extruder was a 1½ inch (screw diameter), 20:1 (length-to-diameter ratio) extruder manufactured by San Diego Custom Extrusions. However, it is obvious to those of ordinary skill in the art that any extruder having the same screw diameter and the same length to diameter ratio could be used to perform the extrusion of the continuous insulating material.

Figure 6:
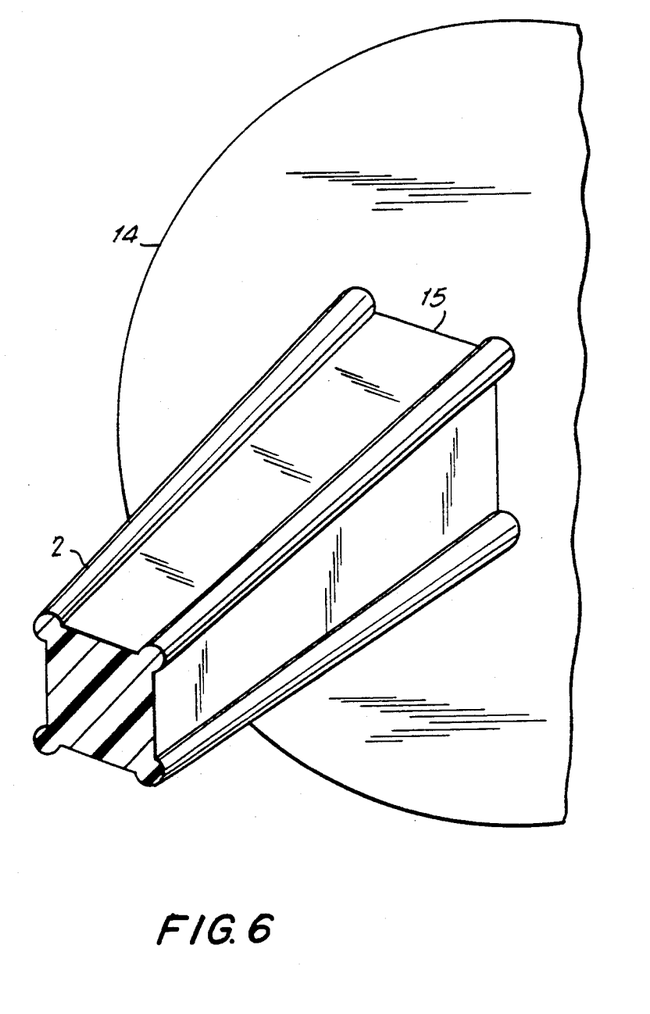
FIG. 6 shows the extruded header being stretched and drawn in accordance with the invention.

When the extruded plastic material exits from hole 15 in the die 14, the plastic material is in a malleable state. The extruded material is immediately immersed in a cooling tank 16 which is filled with water. The extruded header is pulled through the cooling tank 16 by means of a pair of opposing rollers 20. In order to keep the extruded header fully immersed, a pair of guide rods 18, 18' are provided beneath which the extruded header must pass when being pulled by rollers 20. As a result of the tensioning force applied by the rollers 20, the extruded header exiting from hole 15 of die 14 is stretched and drawn such that the dimensions of the final cross section of the header are smaller than the dimensions of corresponding hole 15. After the extruded header passes through rollers 20, it is wound on a reel 22 in a continuous fashion.

The extruded header may be wound on reel 22 manually or by means of a well-known automatic tensioning take-up device.

Figure 7:
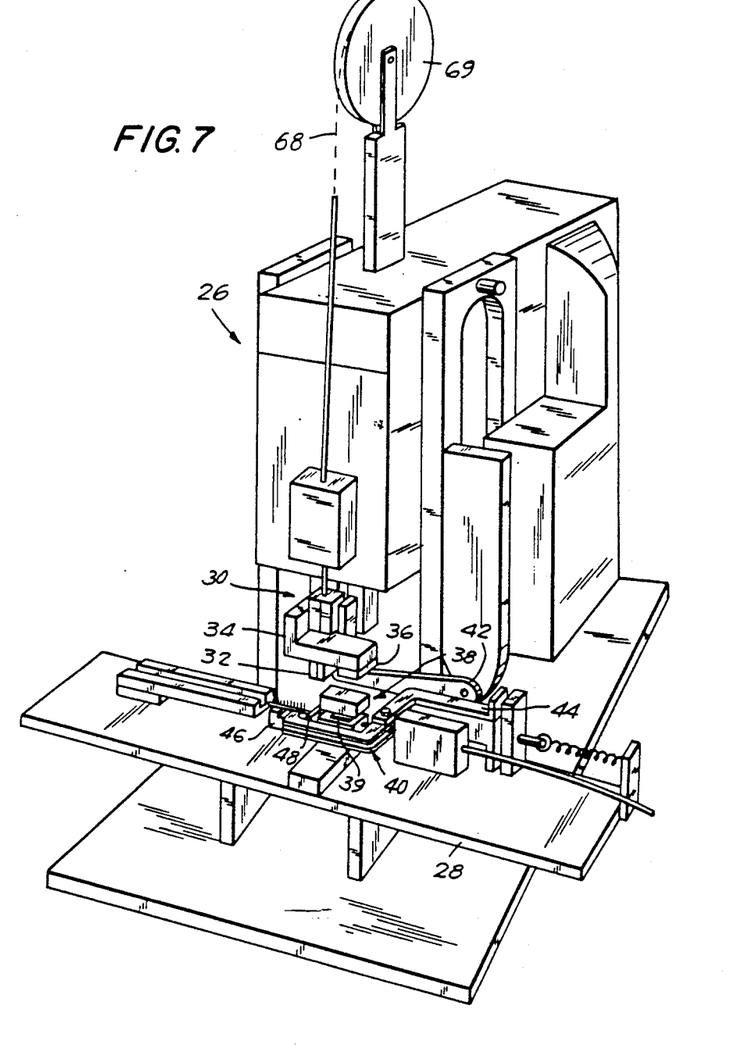
FIG. 7 is a perspective view of the apparatus for punching and notching the extruded header and inserting pins or other electrical components therein in accordance with the invention.

FIG. 7 is a perspective view of the notching, punching and pin insertion station 26. The notching, punching and pin insertion station 26 comprises a pin insertion machine 30 adapted to perform the additional functions of hole punching and notching. The pin insertion machine may be a standard Autopin-2 machine, manufactured by Autosplice, Inc. of Woodside, N.Y., and fully described in U.S. Pat. No. 4,318,964, the contents of which are incorporated herein by reference. The pin insertion machine 30 comprises pin insertion jaws 32 mounted on slidable ram 34. At the end of the downward stroke of ram 34, the pin insertion jaws 32 insert the pin 4 in the extruded header 2 arranged therebelow.

A punching block 36 is also mounted on ram 34. Punching block 36 has a height and is arranged such that during a downward stroke of ram 34, punching block 36 impacts on the top surface of punch 38. As the downward stroke of ram 34 continues, punch 38 is driven by punching block 36 against die 39, whereby the extruded header 2 is simultaneously notched with V-shaped grooves and punched with a hole. This notching and punching step takes place along the extruded header 2 at a point downstream from the point at which a pin terminal 4 is simultaneously inserted in a hole already formed.

The extruded header 2 is fed to the notching and pin insertion station 26 in incremental steps equal to the distance separating adjacent pin terminals. The extruded header 2 is advanced in a stepwise manner by means of advancement arm 40. The end of advancement arm 40 has recesses 41 formed therein for engaging the inserted pin terminals both above and below the extruded header.

Figure 8:
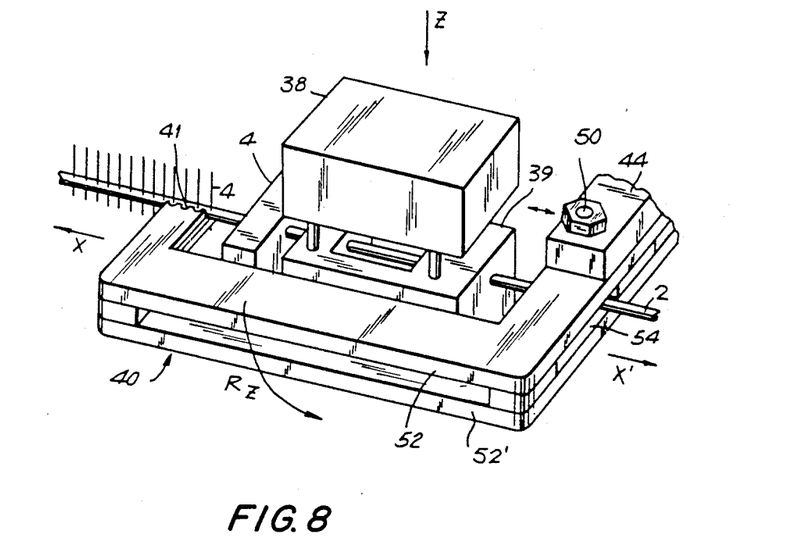
FIG. 8 is a perspective view of the punch and notch die and the mechanism for advancing the extruded header in accordance with the invention.

As best seen in FIG. 8, when recesses 41 engage a plurality of pin terminals, the advancement arm is moved an incremental step in the direction of the arrow X. At the end of this incremental step, the advancement arm 40 is rotated in the direction of arrow $R_z$ about the pivot 50, whereby the recesses 41 disengage from the pin terminals and the advancement arm is returned to its initial position. For example, in the case where there are three recesses 41 which respectively engage three pin terminals 4, during a first incremental advancement in the X direction the recesses will engage first, second and third pin terminals arranged in sequence along the extruded header. During the next incremental advancement in the direction X, recesses 41 respectively engage second, third and fourth pin terminals, wherein the fourth pin terminal has been inserted subsequent to the first incremental advancement and prior to the second incremental advancement.

The advancement arm 40 is rigidly connected to pivot arm 44, pivot arm 44 being rotatably mounted on pivot pin 50. It should also be noted that advancement arm 40 comprises two members 52 and 52', member 52 having recesses 41 which engage the pin terminals 4 above the extruded header and member 52' having recesses 41 which engage the pin terminals 4 below the extruded header 2. In the vicinity of pivot pin 50, members 52 and 52' are separated by a gap of sufficient height to allow passage of the extruded header 2 therethrough.

The pivot arm 44 is coupled to advancement link 42 (by means not shown). Advancement link 42 is in turn rotatably coupled to ram 34 (by means not shown). The linkages between advancement link 42 and pivot arm 44 are such that the advancement arm 40 is advanced in the X direction during the upward stroke of ram 34. Other mechanisms (not shown) are provided for rotating advancement arm 40 at the proper time for disengagement from pin terminals 4. These mechanisms are not shown since the feeding mechanism does not constitute part of the present invention. Furthermore, the design of mechanical linkages for performing incremental advancements is well known to those of ordinary skill in the art.

As best seen in FIG. 8, the punch 38 is coupled to die 39 by means of a plurality of posts 56, preferably four in number. In the preferred embodiment, the punch 38 has corresponding bores for receiving posts 56. Thus, punch 38 is slidable on posts 56 in the downward direction indicated by arrow Z. Each post 56 has a spring (not shown) wrapped therearound which resists downward slidable displacement of punch 38. However, as soon as punching block 36 impacts on the top surface of punch 38, punch 38 is driven downward during the continued downward stroke of ram 34, whereby the resistance offered by the springs mounted on post 56 is overcome. The result is that punch 38 is driven against die 39.

Figure 9:
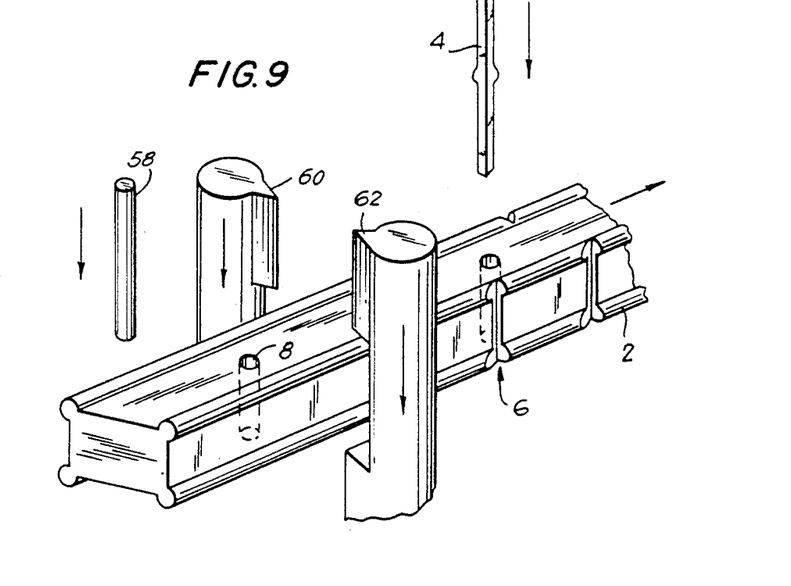
FIG. 9 is a diagrammatic view of a downward stroke of the apparatus shown in FIG. 7 whereby a hole is punched, a pair of notches are formed, and a pin is inserted simultaneously.

As best seen in FIG. 9, punch 38 has a pin hole punch 58 and notch teeth 60 and 62 rigidly mounted thereon. A die 39 holds the extruded header 2 securely in place, the pin hole punch 58 is driven through the extruded header by punching block 36, thereby forming a hole 8. At the same time the notching teeth 60 and 62 are driven downwardly by punching block 36, whereby notches 6 are formed on either side of extruded header 2. The extruder header is then advanced by an incremental distance equal to the distance separating adjacent pin terminals, and the hole punch and notching operation is repeated.

At the same time, i.e. during the downward stroke of ram 34, the pin insertion jaws 32 insert a pin 4 in a hole 8 already formed during a previous downward stroke of ram 34. During pin insertion, the punched and notched portion of the extruded header is guided and supported by guide blocks 46 and 48 arranged upstream and downstream of the point at which the pin terminal is inserted.

Figure 10:
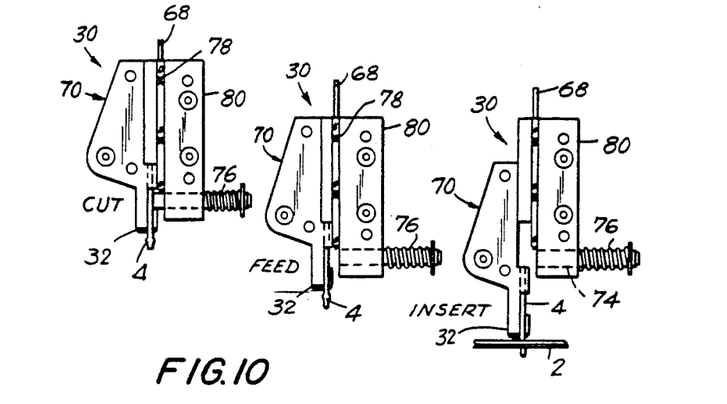
FIG. 10 shows the three steps comprising pin insertion.

The steps of the pin insertion are depicted in FIG. 10. The pin insertion machine 30 receives a wire 68 from a supply reel 69. This wire has been formed into a series of connected pins. The pin insertion machine is adapted to cut off one pin at a time from the end of the wire and then insert the pin in a hole in the extruded header with a vertical downward stroke. Because such a pin insertion machine is well known, only a portion of the machine will be described herein.

The leftmost portion of FIG. 10 shows the cutting step. The wire 68 is feed through a wire guide 78 formed in support block 80 in successive steps. After each step the leading pin of the wire is located in a predetermined position in front of the cutter. A tool 70 comprising two halves (only one of which is shown in FIG. 10) has opposing jaws 72 for receiving the leading pin in the next step. The jaws 72 are urged toward each other by a spring (not shown). When the cutter 74 is driven toward the wire, cutter 74 severs the leading pin from the wire and forces it between the separated jaws 72, where the pin is held by friction (See middle portion of FIG. 10). Spring 76 urges the cutter 74 back to its withdrawn position, as shown in the rightmost portion of FIG. 10. Then the tool 70 performs a downward stroke (by means not shown), with the pin 4 being inserted by the jaws 72 into a hole in the extruded header.

Figure 11A:
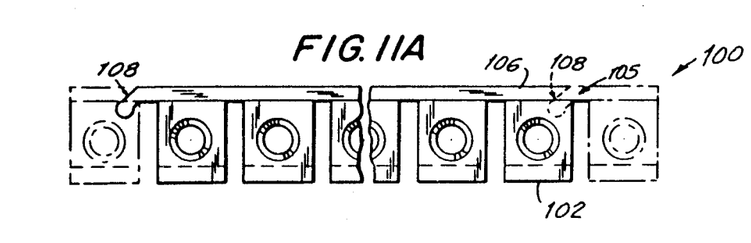
FIGS. 11A and 11B respectively show top and side views of an endless header for a male connector formed in a semicontinuous manner by injection molding.
Figure 11B:
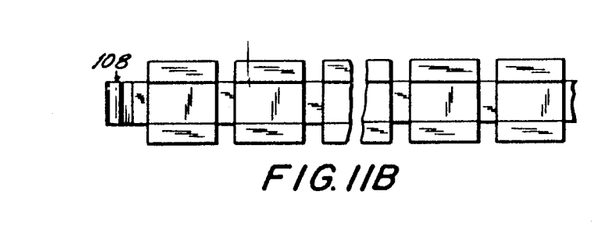

In accordance with another preferred embodiment of the invention, the endless header can be manufactured in discrete segments by injection molding. The discrete segments are made by repeatedly injecting molten plastic into the same mold. As shown in FIG. 11A, each segment of header for an endless male connector has a plurality of units 102, each unit having a hole 104 for receiving a pin terminal or other electrical contact. The holes 104 are formed by suitable tooling in the mold. The units 102 are connected to a longitudinal spine 106. The end of the spine 106 has an angled extension 108 with a knob or other protuberance formed thereon. Naturally, the mold (not shown) has an identical shape, except that at one end of the mold there is an opening 105 for receiving extension 108 of the previously formed segment.

In accordance with the invention, the cavity of the mold communicates with a means for receiving an already formed header segment by way of opening 105. In order to form the first header segment, the opening 105 is blocked by means not shown. Molten plastic is then injected into the mold cavity and allowed to cure (by cooling). After the first header segment has been cured, it is automatically removed from the mold (by means not shown) and inserted in the receiving means (not shown) such that extension 108 of spine 106 of the first header segment extends through opening 105 and into the mold cavity. With extension 108 of the first segment extending into the mold cavity, molten plastic is again injected into the cavity and allowed to cure, thereby forming the second header segment. The injected molten plastic material of the second header segment flows around the knob of extension 108 of the first header segment, whereby the first and second segments are integrally coupled when the second segment solidifies.

This process is repeated whereby successive segments can be formed and linked to the already formed length of header, so that ultimately, as was the case for the header manufactured by extrusion, there is no limit to the length of the final header.

Figure 12:
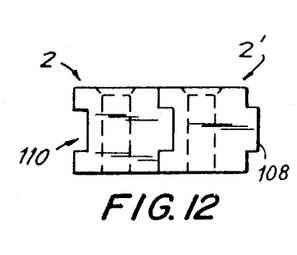
FIG. 12 is an end view showing a means by which two connectors are coupled in parallel.

FIG. 12 is an end view showing headers having longitudinal spines and longitudinal grooves manufactured in accordance with the invention, the groove conforming to the shape of the spine. By snapping the spine 108 of one single-row connector 2 into the groove 108 of another single-row connector 2', two single-row connectors can be coupled to form a double-row connector.

Figure 13:
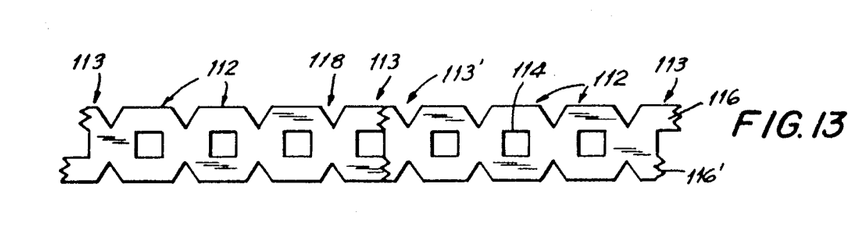
FIG. 13 shows a top view of an endless header for a female connector formed in accordance with the semicontinuous injection molding method of the invention.

As shown in FIG. 13, each segment of header for an endless female connector also has a plurality of units. For illustrative purposes only, the female header segment is shown as having three full units 112 and two partial units 113, 113'. Obviously the segment can have any number of full units while still having two partial units at the respective ends. Each full unit has a hole 114 for receiving a socket or other electrical contact. Each partial unit has surfaces for forming part of the corresponding hole. The units are connected in series. Each partial unit has a pair of webbed surfaces 116, 116', the web comprising one or more projections having a V-shaped profile. Naturally, the mold (not shown) has a shape identical to that of the segment except that the mold has an opening 118 at one end thereof for receiving a partial unit of the previously formed segment.

In accordance with the invention, the cavity of the mold communicates by way of opening 118 with a means for receiving an already formed header segment. In order to form the first header segment, opening 118 is blocked by means not shown. Molten plastic is then injected into the mold cavity and allowed to cure. After the first header segment has been formed, it is automatically removed from the mold (by means not shown) and inserted into the receiving means (not shown) such that partial unit 113 of the first header segment extends through opening 118 and into the mold cavity. With partial unit 113 extending into the mold cavity, molten plastic is again injected into the cavity and allowed to cure, thereby forming the second header segment. The injected molten plastic of the second header segment flows between and around the projections of webbed surfaces 116, 116' of the first header segment, whereby the first and second segments are integrally coupled when the second segment solidifies.

This process is repeated to form an endless header for a female connector of any length. Thereafter sockets (not shown) are inserted in holes 114 by known insertion apparatus.

The foregoing description of the preferred embodiments is presented for illustrative purposes only and is not intended to limit the scope of the invention as defined in the appended claims. Modifications may be readily effected by one having ordinary skill in the art without departing from the spirit and scope of the invention concept herein disclosed. In particular, the method in accordance with the invention can be used to form an endless connector having an endless insulating header with a multitude of electrical contacts (e.g. pins, tabs or sockets) inserted therein.

What is claimed is:

1. A limitless electrical connector wound on a reel and comprising a continuous extruded length of insulating material and a plurality of spaced electrical contacts inserted through and along the entire length of said insulating material, said insulating material having throughout its length aligned sets of notches on opposite sides with each notch set equally spaced from and located between adjacent contacts, whereby any desired length of insulating material containing a desired number of electrical contacts can be separated from the continuous length by severing at a notch set, said continuous length of insulating material having a cross-section, perpendicular to its length, which is the same throughout its entire length except where the notches are formed, said continuous connector having been formed by first extruding said length of insulating material through a die having an opening substantially matching said cross-section, subsequently forming the side notches and inserting the electrical contacts throughout the full length of insulating material, and subsequently winding the continuous length on a reel.

2. The electrical connector as claimed in claim 1 wherein the insulating material is configured to form projections at its corners.

3. The electrical connector as claimed in claim 1 wherein the contacts comprise a single row of straight pins extending parallel to the side notches.

4. The electrical connector as claimed in claim 1 wherein the contacts comprise two parallel rows of straight pins.

5. The electrical connector as claimed in claim 1 wherein the contacts comprise right angle pin terminals.

* * * * *

UNITED STATES PATENT AND TRADEMARK OFFICE
CERTIFICATE OF CORRECTION

PATENT NO. : 4,832,622

DATED : May 23, 1989

INVENTOR(S) : IRWIN ZAHN

It is certified that error appears in the above-identified patent and that said Letters Patent is hereby corrected as shown below:

Column 1, line 16, change "in" to --In--.

Column 9, entire column should be single spaced.

Signed and Sealed this

Twenty-second Day of December, 1992

Attest:

DOUGLAS B. COMER

*Attesting Officer*    *Acting Commissioner of Patents and Trademarks*